Jan. 8, 1957  H. H. GORRIE  2,776,669
FLUID PRESSURE RELAY
Filed Sept. 23, 1952  4 Sheets-Sheet 1
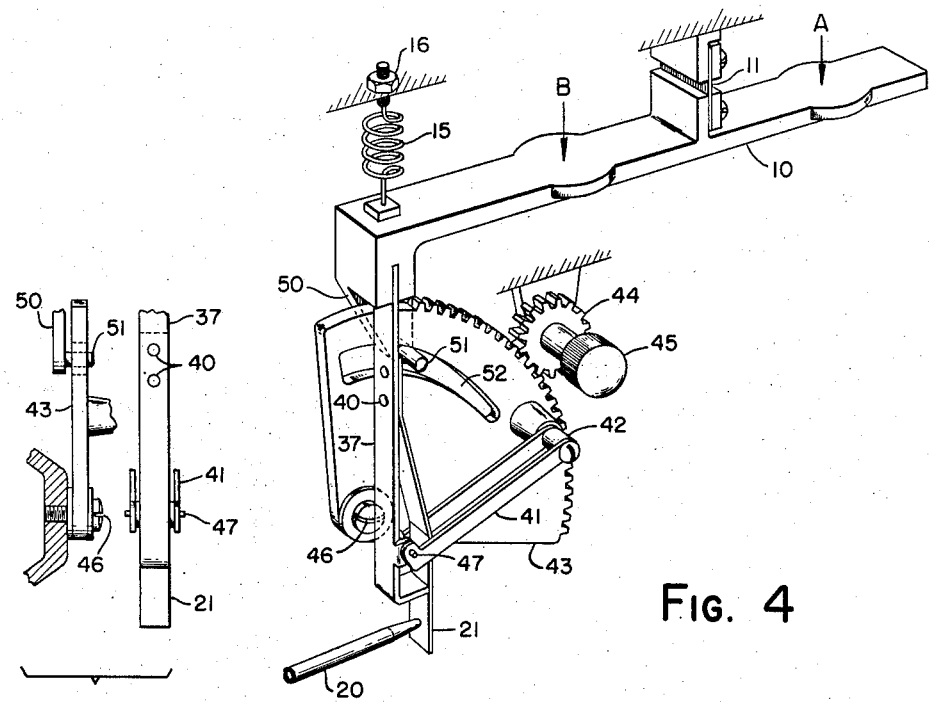
Fig. 3
Fig. 4
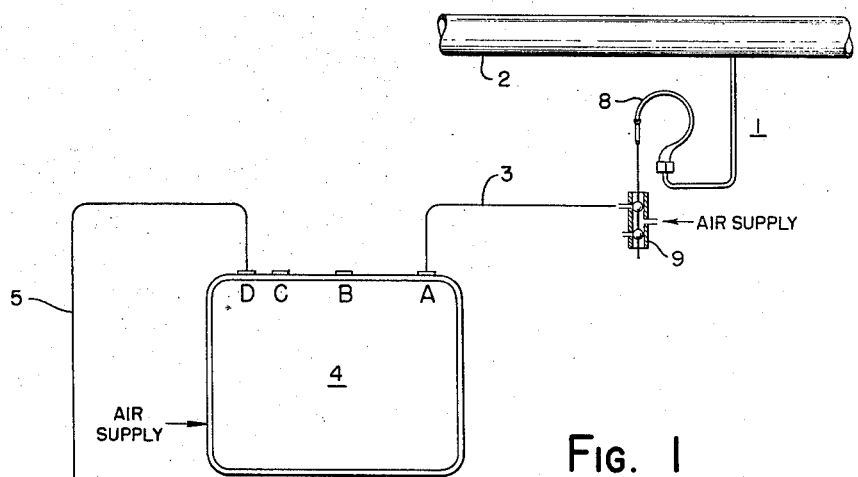
Fig. 1
INVENTOR.
HARVARD H. GORRIE
BY
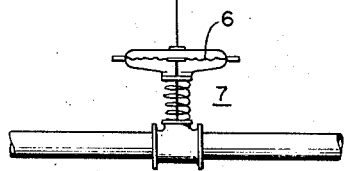
ATTORNEY Jan. 8, 1957 H. H. GORRIE 2,776,669
FLUID PRESSURE RELAY
Filed Sept. 23, 1952 4 Sheets-Sheet 2

INVENTOR.
HARVARD H. GORRIE
BY
Raymond W. Junkins
ATTORNEY

Jan. 8, 1957  H. H. GORRIE  2,776,669
FLUID PRESSURE RELAY
Filed Sept. 23, 1952  4 Sheets-Sheet 3

INVENTOR.
HARVARD H. GORRIE
BY
Raymond W. Junkins
ATTORNEY

| SELECTOR POSITION | VALVE POSITIONS | | | | |
|---|---|---|---|---|---|
| | 5 | 4 | 3 | 2 | 1 |
| HAND | OPEN | CLOSED | OPEN | OPEN | CLOSED |
| AUTO | CLOSED | OPEN | CLOSED | CLOSED | OPEN |

*INVENTOR.*
HARVARD H. GORRIE
BY
Raymond W. Junkins
*ATTORNEY* ved États Patent Office 2,776,669
Patented Jan. 8, 1957

2,776,669

FLUID PRESSURE RELAY

Harvard H. Gorrie, Cleveland Heights, Ohio, assignor to Bailey Meter Company, a corporation of Delaware Application September 23, 1952, Serial No. 311,098

9 Claims. (Cl. 137—86)

My invention relates to control systems operable automatically or manually to maintain substantially constant any desired electrical, thermal, chemical, physical or other variable condition through the control of a corrective agent or agents. More particularly, my invention relates to control systems wherein a fluid pressure is utilized as the motive power for actuating devices to control the rate of application of corrective agents.

It is frequently necessary that a system be provided for regulating the supply of an agent affecting a condition, and the system should be operable either automatically in response to the condition for maintaining it at a desired constant value or manually for varying the condition as desired. The supply of the agent may be controlled by a device which is operated by fluid delivered at a pressure regulated by the system. When the system is switched from automatic to hand control, or vice versa, the pressure supplied to the device immediately after the switch-over should be the same as the pressure supplied before the switch-over was made, otherwise an operation of the device may be obtained to vary the agent so as to upset the whole system. It is therefore desirable that means be provided for regulating the pressure that will be supplied as well as for indicating the various pressures involved. The indication of the various pressures should be at the control station where the automatic-manual switch is made and they should be in such interrelation that desirable comparisions may be made between the incoming pressure and the outgoing pressure, as well as intermediate transfer values and the like.

In systems of this type it is usual to provide a measuring controller for the variable to be controlled, a manual-automatic selector station, one or more relays, and a regulating device (such as a valve) for the agent. These basic devices may be physically located adjacent one another or may be widely separated; due to conditions encountered or the desire of the purchaser.

In many instances the physical location of the measuring point may be far removed from the location of the control valve; and both, a considerable distance from availability to the operator who should be able to observe the value of the variable, the effect of the regulation, as well as to have available the possibility of removing the system from "automatic" and placing it on "manual" control.

Fluid pressure telemetering is known wherein a fluid pressure is developed continuously bearing a relation to the value of the variable or to the extent and direction of departure of the value from desired standard or set point. Such a measuring-controller is a transmitter which may be indicating and recording and may preferably be located adjacent the desirable point of measurement of the variable for many reasons. The fluid loading pressure is transmitted to the control valve for positioning the same, and the transmitter and valve may be widely separated. Intermediate the two is a manual-automatic selector station which may be conveniently located upon a control panel, with other measuring and controlling instrumentalities at a central location, under observation of an operator. It is frequently necessary, in such a system, to have one or more fluid pressure relays and these are preferably functionally located intermediate the transmitter and the selector station so that the relay effects may be available upon the regulating valve through the selector station but, under "manual" control, the relay is not effective upon the regulating valve as would be the case were it functionally located between the selector station and the regulating valve.

In such a system it has been usual to provide the measuring-controller (transmitter) with proportional band or sensitivity adjustability, as well as with set point or standard setting adjustability. But, if the transmitter is located far from the operator he is unable to observe, or change, these adjustments.

A principal object of my present invention is to provide a fluid pressure system of the type described with proportional band and set point adjustment possibilities remote from the transmitter and even remote from each other if desired; preferably the two adjustments may be convenient to the operator.

Furthermore, the operator should have before him a continuous indication or record of the actual value of the variable as well as of the remotely chosen set point value to observe the effectiveness of the regulation at all times. It is therefore a further object of my invention to provide apparatus of this nature.

A particular object of the invention is to provide an improved fluid pressure relay, preferably of the ratio type, receptive of remote set point adjustability, and having proportional band or sensitivity adjustability.

Another object is to provide such a ratio relay, pneumatically actuated, for establishing the loading pressure in predetermined ratio to incoming actuating fluid pressure established by a remote transmitter.

Still another object is to provide such an improved relay of a force-position-balance type having a plurality of force-balance systems interrelated by position-balance.

A further object of the invention is to provide a fluid pressure relay control system for effecting a primary fluid control pressure under the control of a nozzle-baffle couple actuated differentially by force balance beams, one responsive to a fluid loading pressure and the other to a secondary control pressure which latter is established through the action of the primary fluid control pressure, means being provided to manually select the ratio between the fluid loading and the secondary control pressures.

A still further object of the invention is to provide a novel nozzle and baffle couple for establishing a control pressure by relative movement therebetween, the baffle receiving motivating energy coextensive with its length and the nozzle axially, means being provided to manually select the component of movement effective on the baffle in the direction of nozzle axis.

Other objects will appear in the course of the following description.

In the drawings:

Fig. 1 diagrammatically illustrates a fluid measuring and controlling system embodying the invention.

Fig. 3 is a detail of Fig. 2.

Fig. 4 is an isometric view of a portion of Fig. 2.

Figures 9, 10:
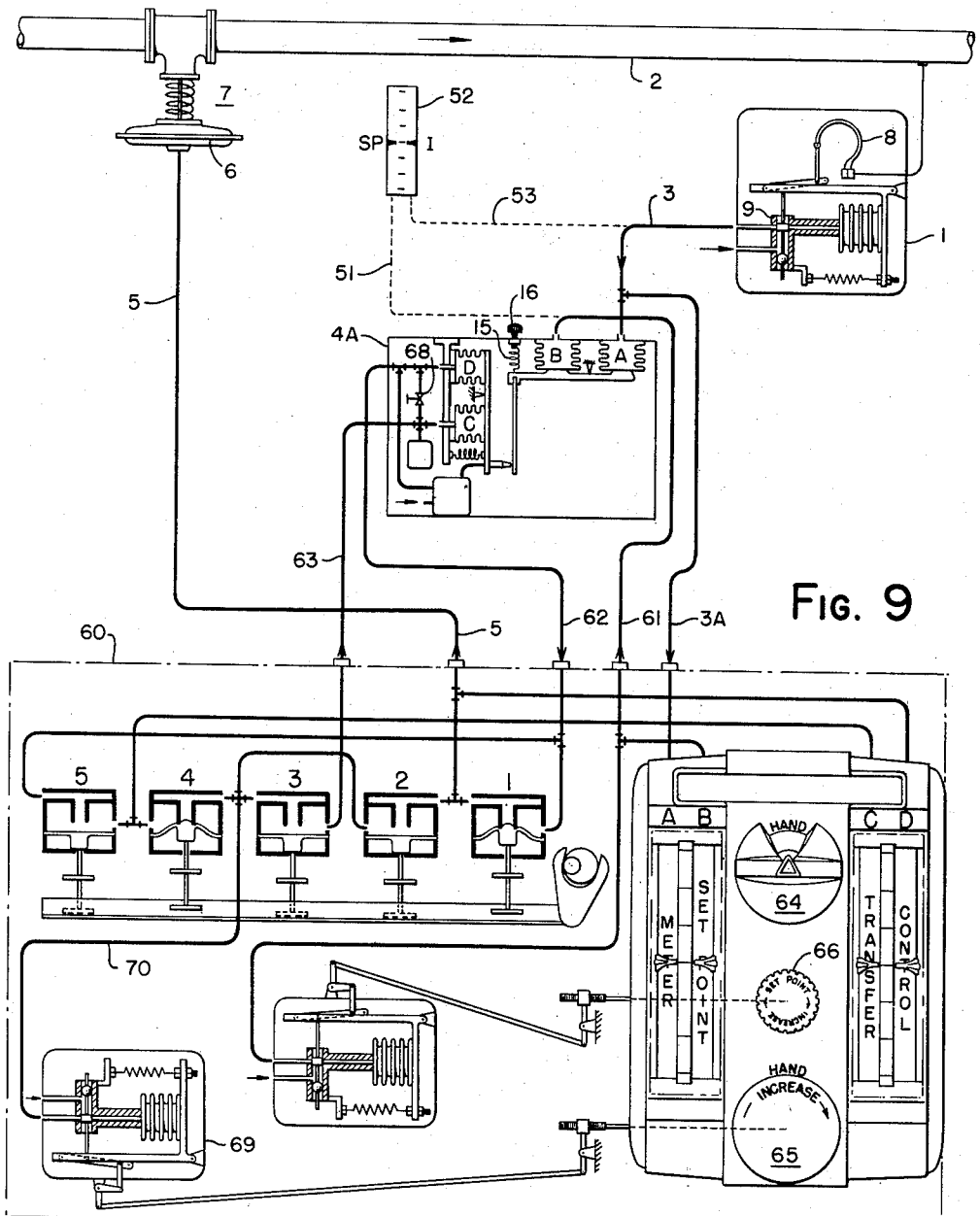

Fig. 9 diagrammatically illustrates a further embodiment of my invention in a fluid pressure measuring and controlling system.

Fig. 10 is a tabulation of valve positions in connection with Fig. 9.

Referring now to Fig. 1, I show therein, quite diagrammatically, a simple fluid pressure control system in which a measuring-controlling transmitter 1 is continuously sensitive to the value of a variable such as fluid pressure within the conduit 2 for continuously establishing in a pipe 3 a pneumatic fluid loading pressure within the range 5–25 p. s. i. g. proportionately representative of some range of values of the variable within the conduit 2. Such a range may be a range from 0 to maximum expected value or a suppressed range within the confines of such extremes.

The pipe 3 joins the A chamber of a pneumatic relay 4 from which a control pressure leaves the D chamber by way of a pipe 5. Pressure within the pipe 5 is subjected upon the diaphragm 6 of a valve 7 for control of the same variable within the conduit 2 or of a different variable.

In the very schematic showing of Fig. 1 I have not included, in the fluid control circuit, a selector station such as was previously mentioned. However, the showing of Fig. 9 includes a selector station which will be later described.

Due to the limitation in space of the present drawing sheet, and the desire to have the components 1, 4 and 7 shown to as large a scale as possible, it is not feasible to accentuate the possibility of distance between said components. It will, however, be appreciated that, in view of my present invention, the transmitter 1 is preferably located immediately adjacent the desired point of pressure measurement for the conduit 2 to minimize measuring piping, lag in measurement, etc. The location of the valve 7 is fixed by design of the plant and may be at a considerable distance from the measuring point 1. Preferably, the relay 4 is located at a central panel board under the observation of an operator, although it may be located at any convenient location. It is therefore apparent that the elements 1, 4 and 7 may be in juxtaposition or may be widely separated from each other. Through the agency of my present invention it is possible to locate these various elements as desired and still retain the desired interrelation of operation with most efficient observation and adjustability by the operator.

As previously mentioned, it is known to usually provide the measuring-controlling transmitter 1 with set point and proportional band adjustments; but they may then be completely inaccessible to the operator. I thus provide that these adjustabilities be available in the device 4 and/or in the selector station later to be described. By removing set point and proportional band adjustments from the transmitter 1 I preferably use therein a pressure establishing mechanism wherein the pneumatic loading pressure in the pipe 3 is continuously representative of pressure of the variable within the conduit 2. Pressure within the conduit 2 is available within a Bourdon tube 8 effective in positioning the movable element of a pilot 9 to establish in the pipe 3 a pneumatic loading pressure having a range of 5–25 p. s. i. for the selected range in the pressure of conduit 2. In other words, the 5–25 p. s. i. range of air pressure within the pipe 3 may represent 0–200, 0–1000, 200–300, or other selected range of pressure within the conduit 2 and under adjustability of the mechanism within the transmitter 1 in known manner. I will now describe in greater detail the pneumatic relay 4 which forms a principal feature of my present invention.

The use of pneumatic relays in such a fluid pressure measuring and controlling system is not new. My invention relates particularly to the form and construction and advantageous features of the one herein disclosed. In general it may be said that a pneumatic relay located between the pipes 3—5 may be useful for any of several reasons. It may be advisable, due to the considerable distance between elements 1 and 7, that a relay of the straight 1–1 ratio be employed. On the other hand, in relation to proportional band operation it may be desirable to introduce a ratio between the pressure of pipe 3 and that of pipe 5, and such ratio or proportional band adjustability may desirably be different under different operating conditions, for different systems, different processes, and the like. Thus proportional band adjustability is desirably available in the relay 4 to the operator, rather than having it remote from him by way of being located in the transmitter 1 or even adjacent the control valve 7. In the relay, of Fig. 1, I provide adjustability for set point and proportional band or sensitivity whereas, in the system described in connection with Fig. 9 I may provide remotely adjusted set point variation for the relay.

Figure 2:
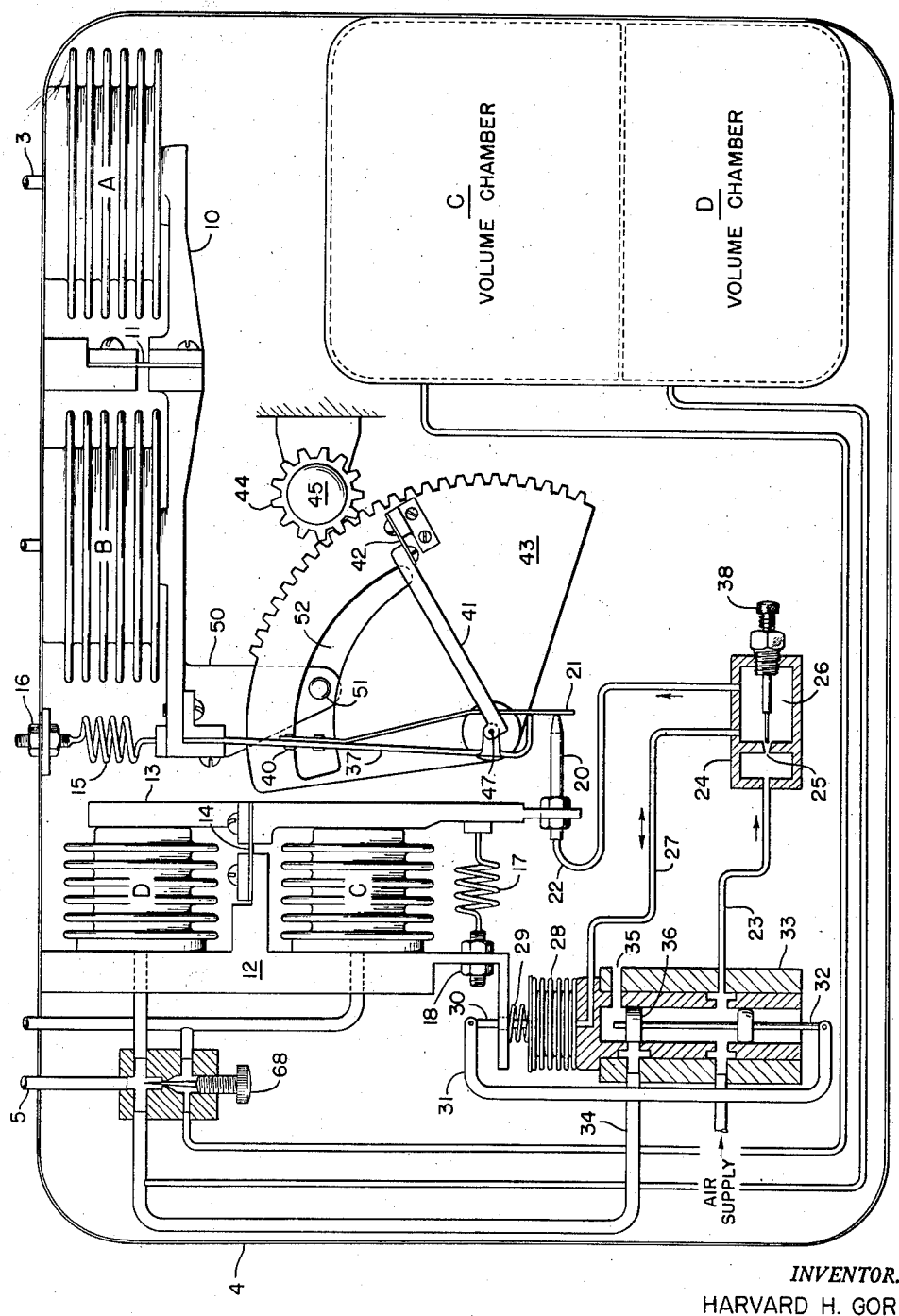
Fig. 2 is a somewhat diagrammatic view of the relay of Fig. 1.

Refer now particularly to Fig. 2 which shows a somewhat diagrammatic view of the mechanism of the relay 4. The pneumatic relay 4 is of the adjustable ratio type of force-position-balance relay. Four expansible-contractible chambers, designated A, B, C and D, take the form of metallic bellows although they might equally as well be diaphragms or other well known constructions which change the position of a movable wall thereof when subjected to varying pressure; in the present instance internally. In Figs. 1 and 2 chambers B and C are idle chambers, open to the atmosphere. Chamber A receives the loading pressure available in pipe 3 whereas chamber D receives the output control pressure of the relay 4 also available in pipe 5 leading to the regulating valve 7. Equal area bellows chambers A and B each have one wall fixed to the casing of the relay 4 and the movable wall of each is fastened to a force-balance beam 10 which is pivoted intermediate the A-B chambers by a leaf or hinge spring pivot 11.

In similar manner one wall of each of the C and D bellows chambers is fastened to a bracket 12 of the relay case and the movable wall of each of the C and D chambers is fastened in spaced relation to a force-balance beam 13 which is similarly hinge pivoted, intermediate the point of force application of the chambers C and D, by way of a leaf spring 14. While, in the present embodiment, the equal area chambers A and B are of a different size than the equal area chambers C and D, this is by no means limiting and is strictly a matter of areas, pressures, and other design calculations.

It will be observed in Fig. 2 that, with atmospheric pressure in chambers A and B the force beam 10 is substantially parallel with the mounting wall of the relay casing and horizontal as viewed in the drawing. The equal area bellows chambers C and D, when subjected to atmospheric pressure, have substantially equal extensions so that the force beam 13 is normally parallel to the support 12 and at right angles to the force beam 10.

Attached to the left end of the force beam 10 is a calibrating spring 15 having tension and/or compression adjustability 16 in known manner. Similarly, at the lower end of the force beam 13 is fastened a calibrating spring 17 having adjustability 18 for tension and/or compression. The calibrating springs 15 and 17 determine the travel distance of the spring end of the respective beams for various loading pressure to the A, B and C bellows chambers. It will be understood that, while in Figs. 1 and 2 I show only the A chamber as receptive of an incoming loading pressure, it may, in certain usages, be desirable to make use of any or all of the receiving chambers A, B and C; or even of D.

The arrangement of Fig. 1, and the description of Fig. 2 in connection therewith, illustrates the simplest ratio relay usage wherein a preselected ratio is attained between the loading pressure within the pipe 3 and the control output pressure within the pipe 5. Chambers B and C are idle chambers open to the atmosphere. With this same relatively simple ratio usage it is, under certain operating conditions, preferable to make use of the B chamber rather than the A chamber, but the operation is substantially identical except for reversal of forces and/or motion.

The force-balance beams 10 and 13 are not physically connected for the balancing of forces therebetween but are functionally interrelated by way of the motion or position of coopertaing parts carried one by the one beam and one by the other. Hence the designation that this relay is of the force-position (or motion)-balance type. In connection with the two force-balance beams I utilize a nozzle-baffle couple. Supported by the lower end of the force beam 13 is a nozzle 20 movable in substantially a horizontal line. Supported by the left hand end of force beam 10 is a baffle 21 positionable in substantially a vertical travel by the beam 10 but, through the agency of certain elements of the assembly later to be described, the actual motion of the baffle 21 is in general along a horizontal line (looking at the drawing) approaching or receding relative to the nozzle 20. Actually the amount of motion of the nozzle 20 and/or the baffle 21 relative to each other, or as a couple, is quite minute and it is only important to point out that it is the relative motion of one element of the couple relative to the other that is of importance in regulating the pressure in the output pipe 5, relative to the pressure of the incoming loading pressure in pipe 3.

Nozzle-baffle couples are not new in this art. When air under pressure is available in the somewhat flexible pipe 22 joining the nozzle 20, any departure of the nozzle 20 and baffle 21, one from the other, will result in an increase in bleed of air from pipe 22 to the atmosphere. If the baffle rests against the end of the nozzle then theoretically the nozzle is closed off and no air is bled from the pipe 22 to the atmosphere. If the baffle moves away from the nozzle (or vice versa) a clearance is soon reached allowing unrestricted discharge of air from the pipe 22 limited only by the size of the orifice of the nozzle exit. The range of the couple is the movement between these extremes of air bleed. In the present case this is a clearance distance of approximately .0005" and the total travel of the elements 20, 21 as a couple is approximately 1/16".

Clean, dry air under a supply pressure of preferably 28 p. s. i. g. is assumed to be available in a pipe 23 joining an orifice block 24 having a fixed orifice 25, the orifice being sized to allow a flow of air therethrough to a chamber 26 at a rate to normally maintain a pressure of about 1 p. s. i. g. in the chamber 26 when free discharge of air occurs from the nozzle 20 to the atmosphere, i. e. when a clearance of approximately .0005" exists between the nozzle 20 and the baffle 21. If the nozzle 20 and baffle 21 approach each other, thus decreasing the free flow of air from the pipe 22 to the atmosphere, the back pressure within the chamber 26 will increase and can increase to the maximum of supply pressure 28 p. s. i. if the nozzle bleed is completely closed off by the baffle.

Connected with the chamber 26, by a pipe 27, is a bellows 28 having its lower end (on the drawing) fixed and its upper end movable against the loading of a spring 29. Motion of the movable end of the bellows 28 is carried by a projection 30 to position a yoke 31 from the lower end of which is supported the movable element 32 of a pilot valve assembly 33. The pilot 33 performs the service of regulating the value of a control pressure within a pipe 34, the output pipe 5, and the balance bellows D. This is accomplished through admitting to the pipe 34 pressure from the 28 p. s. i. supply, or exhausting from the pipe 34 to the atmosphere through a port 35. From the position shown, if the pilot stem 32 is moved upwardly then the land 36 uncovers the lower portion of the port adjacent the pipe 34 so that supply air pressure under 28 p. s. i. will be admitted to the pipe 34. If the pilot stem 32 is moved downwardly pressure within pipe 34 is bled to the atmosphere through the outlet 35.

The principle of operation is based upon a change in loading pressure to the A, B or C bellows (in the present example to the A bellows) causing motion of the baffle 21 and nozzle 20 with respect to each other so that a correct output pressure at the D bellows will be established for the desired condition of control. At the same time the application of the output control pressure in the D bellows repositions the nozzle 20 to reestablish the normal relation of the nozzle-baffle couple.

An increase in loading pressure to the A chamber will expand the A bellows and urge the right end of the force beam 10 down, about the leaf spring 11, against the resistance of the calibrating spring 15, moving the baffle arm 37 up and the baffle 21 closer to the nozzle 20. This will decrease the air discharge through the nozzle 20, thus increasing the back pressure in pipe 22 and chamber 26 as well as in bellows 28. Bellows 28 will expand against the loading spring 29, moving the rod 30 and yoke 31 upwardly, thus raising the pilot stem 32 and uncovering the outlet pipe 34 to admission of supply pressure air. This will increase the control pressure at output pipe 5 and also cause expansion of the D bellows. The top of the force beam 13 will move to the right, pivoting about its hinge 14, and cause the nozzle 20 to follow-up (in this instance to move away from) the baffle. This will decrease the pressure in the nozzle supply chamber 26 and the pilot bellows 28 thus returning the upper pilot stem land to shut-off position relative to pipe 34 to maintain the new control pressure in pipe 5 to the valve 7.

A change in loading pressure to the C bellows (in the event that the loading pressure is so connected) is always reproduced at a one to one ratio in the D bellows, whereas a like change in A bellows pressure or B bellows pressure will be reproduced in the D bellows at a ratio dependent upon the proportional band setting. Reverse action may be obtained by the application of the loading pressure to the B bellows, so that an increase or decrease in loading pressure will cause a respective pressure decrease and increase in the D bellows. Loading pressures applied to both the A and C bellows will act additively and an algebraic totalizing action is obtained.

In Fig. 2 a spring retracted plunger 38 carries a needle which is arranged to cooperate with the orifice 25 for cleaning the latter of any dirt or other matter which might tend to vary its discharge area.

The spring 15 and its adjustment 16 actually may function as a local set point adjustment to vary the standard or operating level determining a condition of balance of the force beams 10, 13 and the nozzle-baffle couple 20—21. In connection with Fig. 9 I will describe how the relay may be receptive of a remote set point loading pressure established at a central control location.

I will now explain the proportional band adjustment features provided in connection with the nozzle 20 and baffle 21, intermediate the force beams 10 and 13.

The motion of the couple baffle for incremental movement of the left end of the force beam 10 is determined by the proportional band adjustment assembly. The "proportional band" is a ratio of the change in input loading pressure at the A or B bellows to the change in the output control pressure at the D bellows connection. The relay 4 is basically a "ratio relay" and thus a change in the ratio between the effect of force beam 10 and that of force beam 13 is a change in proportional band. This is the sensitivity of the system. The "proportional band" may be expressed as:

$$\text{Percent proportional band} = \frac{\text{change in input loading pressure (100)}}{\text{change in output control pressure}}$$

The proportional band availability for this relay varies from about 4% to 200% for approximately 90° rotation of the proportional band sector adjustment. This means that a 0.8 p. s. i. g. change in the loading pressure to the A or B bellows is capable of producing a 20 p. s. i. g.

change in the control pressure in chamber D and output pipe 5 when the proportional band adjustment is set at one extreme of travel and, when set at the other extreme of travel a 1 p. s. i. g. loading pressure change will cause a 0.5 p. s. i. g. control pressure change in the output.

Turning of the proportional band adjustment varies the angle between the baffle drive link and the sector link. This angle, in turn, governs the amount of motion of the baffle with respect to the nozzle for a given movement of the A—B force beam 10.

As may be seen at Figs. 2, 3 and 4, the baffle 21 is of a relatively lighter gage stock than is the baffle arm 37. The upper end of the two are riveted together as at 40. The lower end of the baffle arm 37 is bent to form a stop against which the baffle 21 is normally lightly spring-pressed but, if the lower end of the baffle 21 engages the end of the nozzle 20, then the baffle 21 moves away from the bent end of the baffle arm 37 by virtue of the springiness of the baffle 21, to protect the mechanism from damage.

Pivoted to the lower end of baffle arm 37 are one or more sector links 41 which, at their other end are pivotally connected as at 42 by a shaft pivot (Fig. 4) or a leaf spring pivot (Fig. 2). The type of pivot is not important. Pivot 42 is, however, definitely located near the perimeter of a sector 43 of somewhat over 90° span, having teeth on its perimeter engageable with an adjusting gear 44 provided with a manually movable knob 45 for rotating the sector 43 around its fixed pivot 46.

The pivot 47 interconnecting the baffle arm 37 and the sector link 41 is a floating pivot so arranged that downward or upward movement of the left-hand end of the force beam 10 will cause a motion of the baffle 21 away from or toward the nozzle tip 20, a distance dependent upon the setting of the proportional band sector 43.

The force beam 10 is provided at its left-hand end with a projection 50 having thereon a stop pin 51 projecting through a slot 52 in the sector 43. As shown in Figs. 2 and 4 the slot 52 describes an arc of approximately 90° around the floating pivot 47 and is wider at the left-hand end than it is at its right-hand end. When a normal condition of balance exists in the system, for example with pressure within the chamber A balancing the spring 15 and pressure within chamber D balancing the spring 17 so that a normal horizontal position of force beam 10 and normal vertical position of force beam 13 results in normal bleed clearance of the baffle 21 relative to the nozzle 20, any rotation of the sector 43 by way of the elements 45, 44 will travel the stop pin 51 within the slot 52 without engaging the pin 51 against the edge of the slot. Under such condition of balance the floating pivot 47 is aligned with the fixed pivot 46 and the center line of the slot 52 lies on a circle enscribed around the aligned pivot centers.

The right-hand end of the slot 52 is known as the narrow proportional band extreme adjustment, whereas the left-hand end is known as the widest proportional band adjustment. Thus, under wide band adjustment a greater movement of the beam 10 around its pivot 11 (with corresponding greater vertical travel of the pin 51) will be necessary for incremental output pressure change than under narrow band adjustment when the sector is so angularly positioned in a CCW direction that the pin 51 is at the narrow end of the slot 52, wherein a minute positioning of the beam 10, and corresponding minute motion of the pin 51 across the narrow end of the slot 52, will produce desired change in output pressure.

Reference should now be had to Figs. 5, 6, 7 and 8 wherein I have shown single line diagrams representing different positions of the proportional band sector and linkage for explanatory purposes. Inasmuch as this is quite diagrammatic, the angular motions are greatly magnified over what they actually would be in the construction of Fig. 2 and in the actual commercial relay.

Figure 5:
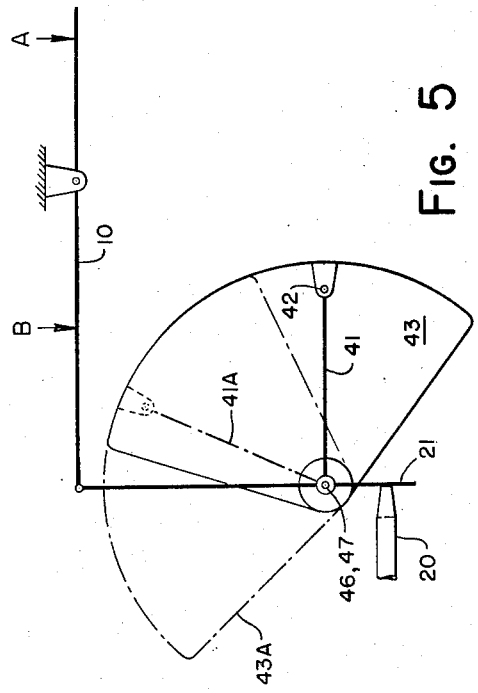
Figs. 5, 6, 7 and 8 are linkage diagrams showing portions of the assembly of Fig. 2 in different positions, for explanatory purposes.

In Fig. 5 I depict the beam 10 under a condition of balance as lying substantially horizontally and with the baffle 21 substantially vertical with the pivots 46, 47 aligned. The sector 43 is drawn in solid line at its extreme CW position of angular movement wherein the stop pin 51 is in the widest portion of the slot 52 representing a wide proportional band adjustment. The link 41 is depicted as lying in a horizontal plane substantially parallel with the beam 10 and with the nozzle 21 spaced with about .0005" clearance from the end of nozzle 20 to provide full bleed therefrom to the atmosphere and corresponding pressure of about 2 p. s. i. within the orifice chamber 26. In dot-dash line I show, as at 43A, the other extreme of CCW angular positioning of the sector 43 and the resultant position of the link 41A. It will be observed that in such condition of balance, wherein the pivots 46, 47 are aligned, full range of proportional band adjustment by swinging the sector 43 to the position 43A will not vary the location of the baffle 21 relative to the nozzle 20. As soon, however, as beam 10 angularly moves from its position of balance the adjusted position of segment 43 comes into play in varying the resultant motion of the baffle 21, relative to the nozzle 20, for incremental movement of the beam 10. Such resultant positioning of the baffle 21 will however be quite different, for incremental movement of the beam 10, depending upon where the sector 43 is in its possible approximate 90° travel.

Figure 6:
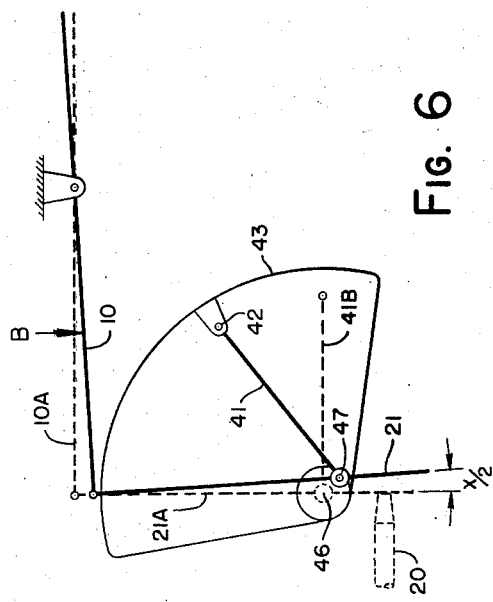

Fig. 6 shows the sector 43 in approximately its mid-adjusted position as well as the corresponding position of the pivot 47, the link 41, the baffle 21, and the beam 10, when the beam 10 has been tilted through application of a force B downwardly an exaggerated amount from its previous horizontal position of balance. Such previous position is shown by the dash line 10A, 21A and 41B. Thus, in the mid-adjusted proportional band position of the sector 43 the new location of the pivot 47 results in a much amplified movement of the baffle 21 away from the nozzle 20 when the beam 10 is angularly moved CCW. Thus, incremental positioning of the beam 10 results in considerably greater departure of the baffle 21 from the nozzle 20, under the sector position of Fig. 6 than for the solid line sector position of Fig. 5.

Figure 7:
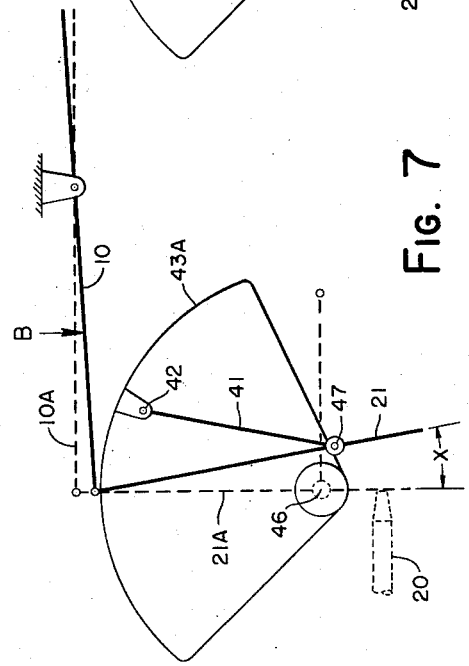

Fig. 7 shows the sector 43 at the narrow band extreme of adjustment coinciding with the position 43A of Fig. 5. In this position the pivot 47 has moved away from the pivot 46 by its greatest possible travel and the same angular CCW movement of the beam 10 (reference to the dash line 10A) results in an angular movement of the baffle 21 a distance X approximately twice that of the angular movement of the baffle 21 under the conditions of Fig. 6.

Figure 8:
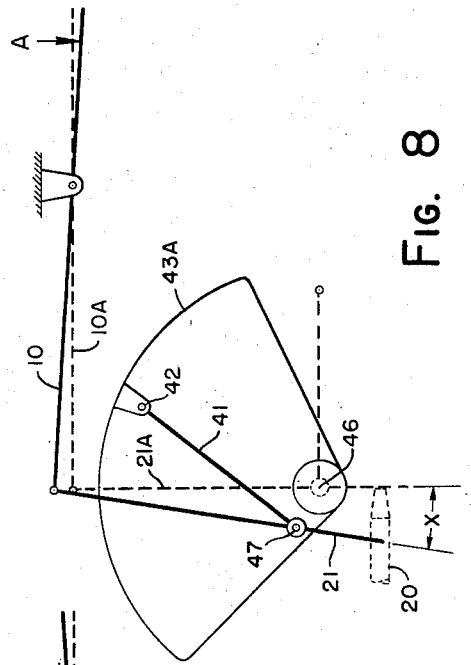

If the primary force acting upon force beam 10 is applied to chamber A then the condition of Fig. 8, for reverse actuation, may be compared to Fig. 7. Sector 43A remains in the same position, beam 10 has been angularly moved CW the same distance from 10A as it was CCW in Fig. 7. Baffle 21 assumes a theoretical position as do the pivots 46, 47. Angle X remains substantially the same as in Fig. 7 but is on the opposite side of pivot 46.

It is believed that this explanation, in connection with Figs. 5, 6, 7 and 8, clearly shows the effect of an incremental movement of beam 10, upon the positioning of the baffle 21 relative to the nozzle 20, under different positions of the proportional band adjustment sector 43 from one extreme of its travel to the other, a total availability of approximately 90°.

Thus, the relay 4 is a ratio relay whereby movement of the sector 43, about its pivot 46, will vary the ratio of pressures between that imposed upon chamber A or B and that produced in chamber D. The ratio adjustment 43, 44, 45 provides proportional band or sensitivity adjustment remote from the transmitter 1 and from the control valve 7. The relay 4 may usually be located on the rear of the central control panel accessible to the operator. Removal of set point adjustment and proportional band adjustment from the measuring-controller frees the same for producing an air pressure which is a true measure of the variable; allowing any number of remote indicators, or recorders, to be actuated from the pressure within pipe 3, without distortion of the pressure in pipe 3 as would result were the adjustabilities in the device 1.

I will now refer to Fig. 9 wherein I show a further embodiment of my invention wherein the relay 4 is arranged as a standardizing or reset action relay. The system of Fig. 9 also includes a selective automatic-manual control station provided with remotely adjustable set point loading pressure which may be imposed upon one of the chambers of the relay 4.

The showing of Fig. 9 is again, quite diagrammatically, a simple fluid pressure control system in which the measuring-controlling transmitter 1 is continuously sensitive to the value of fluid pressure within the conduit 2 and continuously establishes in a pipe 3 a pneumatic fluid pressure within the range 5–25 p. s. i. g. proportionately representative of some range of values of the variable within the pipe 2. In this illustration I preferably use as the transmitter 1 a pressure establishing mechanism of the type disclosed and claimed in the copending application of Harvard H. Gorrie SN 169,751, now Patent 2,675,015.

I have indicated that the pipe 3 is branched as at 3A to enter a selector station 60. Additionally the selector 60 is joined by pipes 61, 62, 63 and 5, all having arrows indicating the direction of application of the fluid pressures therein. For instance, the pipes 3A and 62 transmit pneumatic pressures to the device 60 while pipes 61, 5 and 63 transmit pneumatic pressures from the device 60. It will be seen that, in general, the measurement pressure in pipe 3A enters the device 60 while the control pressure in pipe 5 passes from the device 60 to actuate or position the valve 7.

The device 60 provides selective possibilities and when the selector knob 64 is in "automatic" position, then the loading pressure in pipe 3, acting through the selector 60 and in conjunction with the relay 4A, is passed to the pipe 5 for impression upon the diaphragm 6 of the valve 7. When it is desired to place the control of the valve 7 under "hand" domination from the location 60, it is possible to turn the knob 64 to its "hand" position and thereafter control the pressure in the pipe 5 by means of a hand control knob 65. A third knob 66 is provided through whose agency is established a fluid loading pressure representative of desired set point which is imposed upon the B chamber of the relay 4A. Thus, in the relay 4A the loading pressure from pipe 3, effective in the chamber A, is compared to a remotely established set point loading pressure effective in chamber B, and when the measured variable is in agreement with the set point value the force beam 10 will be in balance.

It does not appear necessary to go into further explanation of the selector station 60 with its possibility of remotely establishing a set point loading pressure for the B chamber of relay 4A as this arrangement is disclosed and claimed in the co-pending application of Paul S. Dickey, SN 287,074 now Patent 2,747,595.

In this illustration the relay 4A is formed to be a differential ratio standardizing relay in which all four of the chambers A, B, C and D are used. The pipe 62 carrying output or D chamber control pressure is joined to the C chamber by way of an adjustable restricting valve 68. The function of the standardizing relay 4A is to reproduce the loading relationship between chambers A and B in the outgoing control pressure pipe 62 and by means of a regenerative action, to amplify the change in outgoing air loading pressure until the incoming effect is returned to a predetermined value. This action gives a proportional plus reset response. A floating control of high sensitivity is superimposed upon a positioning control which may be of relatively low sensitivity. The result, in the output pipe 62, is that upon change in the relationship between the A and B chamber pressures, there is an immediate response in pressure change in pipe 62 in the same direction followed by a continuing regenerative readjustment of the pressure in pipe 62 which may be in the same direction or in the opposite direction until the condition is satisfied.

In the system of Fig. 9 the selector station valve (3) is used in the "hand" position shown; the output pressure of device 69, available in a pipe 70, passing through the valve (3) which joins the C chamber of relay 4A by way of pipe 63. Thus the bleed 68 is effectively overruled by imposing upon the C chamber the pressure established manually by the device 69 and which is at the same time effective within the pipe 5 for positioning the valve 7. Under "hand" control the measuring instrumentalities continue to impress their loading pressures upon the relay 4A and the final loading pressure output of the relay 4A, available in pipe 62 and bellows D, would possibly be quite erratic at time of future switch-over from hand to automatic. Thus, during "hand" control the bleed 68 is by-passed by the pipe 63.

It will be understood that, under certain conditions, I may preferably position the nozzle 20 by the force beam 10 and position the baffle 21 by the force beam 13, with appropriate changes in the other parts or actions of the relay 4.

It is also evident that, while I have spoken of pneumatic pressures, the invention is equally applicable to any fluid pressure.

While I have chosen to illustrate and describe my invention in certain preferred embodiments, it will be understood that this is by way of example only, and I do not desire to be limited thereby.

What I claim as new and desire to secure by Letters Patent of the United States, is:

1. In a control system of the fluid pressure actuated type, a fluid pressure relay having in combination, a first force-balance beam, a first expansible-contractible chamber receiving a fluid loading pressure continuously representative of the value of a variable to be controlled, a second similar chamber, said beam being pivoted and arranged to be oppositely acted upon by said first and second chambers; a second pivoted force-balance beam, third and fourth similar expansible-contractible chambers arranged to opposingly act upon said second beam; a primary fluid control pressure establishing means including a pair of cooperating air nozzle and baffle couple elements, one element positioned by and with the first beam and the other element positioned by and with the second beam; a secondary fluid control pressure establishing means connected to be responsive to the pressure established by the primary fluid control pressure establishing means, unrestricted pipe means interconnecting the pressure from the secondary control pressure establishing means with one of the chambers acting upon the second beam thus impressing the developed secondary control pressure upon the second force-balance beam for position comparison with the first force-balance beam relative to a position-balance relation for the two force-balance beams, means acting to change the ratio of movement of one couple element in respect to its motivating beam comprising a sector movable about a fixed pivot, the cooperating couple element carrying a floating pivot which in the said position-balance relation is aligned with said fixed pivot, a link connecting the floating pivot and a pivot near the perimeter of said sector, and means for adjusting the sector angularly about the fixed pivot in either direction thus increasing or decreasing the ratio between the loading and the secondary control pressures.

2. In a control system of the fluid pressure actuated type, a fluid pressure relay having in combination, a first force-balance beam, a first expansible-contractible chamber receiving a fluid loading pressure continuously representative of the value of a variable, an opposing second similar chamber, the said beam pivoted and arranged to be oppositely acted upon by said first and second chambers; a second pivoted force-balance beam normally extending at right angles to the first, a third and a fourth similar expansible-contractible chamber arranged to opposingly act upon said second beam; fluid control pressure establishing couple means including a nozzle and a flexible baffle, the baffle extending substantially normal to and positioned by and with said first beam and the nozzle extending normal to and positioned by and with said second beam; an adjustable ratio means including a link pivoted to the baffle near the nozzle cooperating end thereof and having a movable pivot for its opposite end; means responsive to the pressure established by said couple to establish a control pressure, and pipe means interconnecting the control pressure establishing means with one of the chambers acting upon the second beam thus impressing the developed output control pressure upon the second force-balance beam for position comparison with the first force-balance beam relative to a position balance relation for the two force-balance beams in accordance with the ratio between the input and output loading pressures as established in conjunction with said ratio adjusting means.

3. The control system of claim 2 in which the movable pivot for the opposite end of the said link is mounted on a sector having a fixed pivot which coincides with the link pivot to the baffle when the latter is in its normal reference position.

4. The system of claim 3 in which the sector pivot is parallel to that of the first beam, a tapered slot in said sector having its axis concentric with the sector pivot, an arm near one end of said first beam having a pin extending through said slot and of less diameter than its minimum width whereby rotational adjustment of the sector to change the ratio of baffle movements to beam displacement changes the range of beam movement.

5. A nozzle and baffle couple for establishing a control pressure comprising in combination, a nozzle, means to move said nozzle substantially axially toward and from a resilient baffle plate, means to apply force to move said baffle substantially coextensively with its length and transversely to the nozzle axis, a link having one end pivoted to the baffle near its active end, and means providing a pivot for the opposite end of said link adjustable coaxially to the first link pivot at its neutral point whereby varying components of said force are available to move the baffle toward and from the nozzle along the axis of the latter.

6. A baffle assembly for use in a nozzle baffle couple to establish a control pressure including in combination, a baffle carrier of flat elongated form having an end adapted to be mounted for longitudinal baffle movement, a baffle stop at the opposite end of the carrier extending substantially parallel to the nozzle axis, a thin flexible baffle secured to the carrier near said first end and extending into contact with the end of said stop and beyond it for cooperation with the nozzle, a link pivoted to said carrier near said stop, an adjustable pivot for the opposite end of said link and means defining an arcuate path for said pivot about said link connection to the carrier.

7. The baffle assembly of claim 6 in which means actuated by adjustment of the said pivot along its arcuate path provides correlated limits to longitudinal movement which may be imparted to the baffle.

8. In a control system of the fluid pressure actuated type, a fluid pressure relay having in combination, a first force-balance beam, an expansible-contractible chamber receiving a fluid loading pressure continuously representative of the value of a variable to be controlled, means pivoting said beam to be oppositely acted upon by said chamber and an opposing force; a second pivoted force-balance beam, an expansible-contractible chamber arranged to act upon said second beam in opposition to an opposing force; a primary fluid control pressure establishing means including cooperating air nozzle and baffle couple elements, one element positioned by and with said first beam and the other element positioned by and with said second beam; a secondary fluid control pressure establishing means connected to be responsive to the pressure established by the primary fluid control pressure establishing means; unrestricted pipe means interconnecting the pressure from the secondary control pressure establishing means with the chamber acting upon the second beam for position comparison of said beam with the first force-balance beam relative to a position-balance-relation for the two force-balance beams; means acting to change the ratio of movement of one couple element in respect to its motivating beam comprising a floating pivot on the cooperating couple element which in said position-balance-relation has a definite locale, a link connected to the floating pivot, a pivot for the remote end of said link, and means for adjusting said last mentioned pivot along an arcuate path centered on said locale thus increasing or decreasing the ratio between the loading and the secondary control pressures.

9. In a control system of the fluid pressure actuated type, a fluid pressure relay having in combination, a first force-balance beam, a first expansible-contractible chamber receiving a fluid loading pressure continuously representative of the value of a variable to be controlled, a second similar chamber, means pivoting said beam to be oppositely acted upon by said chambers; a second pivoted force-balance beam; a third and a fourth similar expansible-contractible chamber arranged to opposingly act upon said second beam; a primary fluid control pressure establishing means including cooperating air nozzle and baffle couple elements, one element positioned by and with said first beam and the other element positioned by and with the said second beam; means to establish a secondary fluid control pressure for controlling said variable connected to be responsive to the pressure established by the primary fluid control pressure establishing means, unrestricted pipe means interconnecting the pressure from the secondary control pressure establishing means with that one of the chambers acting upon the second beam adapted to move it in a direction to reduce the effect of the movement of the first beam on the baffle couple, and means acting to change the ratio of movement of one couple element in respect to its motivating beam, said element having a floating pivot, a link connected to the floating pivot and having a pivot at its opposite end, and means for adjusting the position of the last mentioned pivot in either direction thus increasing or decreasing the ratio between the loading and the secondary control pressures.

References Cited in the file of this patent

UNITED STATES PATENTS

| 2,061,118 | Vogt | Nov. 17, 1936 |
| 2,215,423 | Heftler | Sept. 17, 1940 |
| 2,298,112 | Edwards | Oct. 6, 1942 |
| 2,310,298 | Kuhl | Feb. 9, 1943 |
| 2,361,885 | Tate et al. | Oct. 31, 1944 |
| 2,441,044 | Tate | May 4, 1948 |
| 2,507,606 | McLeod | May 16, 1950 |
| 2,638,874 | Woodhull | May 19, 1953 |

OTHER REFERENCES

Moore Products Co. (Philadelphia, Pa.), Instructions 505-S for Nullmatic Controller Models 50 and 55, 1947–48, pages 2–7.